United States Patent
Hosmani et al.

(10) Patent No.: US 10,795,768 B2
(45) Date of Patent: Oct. 6, 2020

(54) MEMORY REALLOCATION DURING RAID REBUILD

(71) Applicant: Seagate Technology LLC, Cupertino, CA (US)

(72) Inventors: Kushal R. Hosmani, Bangalore (IN); Thomas George Wicklund, Longmont, CO (US); Ian Davies, Longmont, CO (US); Ryan Patrick McCallister, Erie, CO (US)

(73) Assignee: Seagate Technology LLC, Fremont, CA (US)

( * ) Notice: Subject to any disclaimer, the term of this patent is extended or adjusted under 35 U.S.C. 154(b) by 61 days.

(21) Appl. No.: 16/166,936

(22) Filed: Oct. 22, 2018

(65) Prior Publication Data
US 2020/0125447 A1    Apr. 23, 2020

(51) Int. Cl.
*G06F 11/10* (2006.01)
*G06F 11/20* (2006.01)
*G06F 3/06* (2006.01)

(52) U.S. Cl.
CPC .......... *G06F 11/1092* (2013.01); *G06F 3/065* (2013.01); *G06F 3/0619* (2013.01); *G06F 3/0652* (2013.01); *G06F 3/0689* (2013.01); *G06F 11/1096* (2013.01); *G06F 11/2094* (2013.01)

(58) Field of Classification Search
CPC ............. G06F 11/1092; G06F 11/2094; G06F 3/0619; G06F 11/1088; G06F 3/0652; G06F 3/0689; G06F 11/1666; G06F 3/0631; G06F 3/065; G06F 11/1096
See application file for complete search history.

(56) References Cited

U.S. PATENT DOCUMENTS

| | | | |
|---|---|---|---|
| 8,543,761 B2 | 9/2013 | Goldick | |
| 8,938,584 B2 | 1/2015 | Nelogal et al. | |
| 9,632,891 B2 | 4/2017 | Thomas et al. | |
| 9,921,912 B1 | 3/2018 | Vankamamidi et al. | |
| 2007/0088990 A1 | 4/2007 | Schmitz | |
| 2016/0077746 A1* | 3/2016 | Muth | G06F 3/0652 711/159 |
| 2018/0357159 A1* | 12/2018 | Parker | G06F 3/0688 |
| 2019/0317889 A1* | 10/2019 | Chang | G06F 12/023 |

* cited by examiner

*Primary Examiner* — Zhuo H Li
(74) *Attorney, Agent, or Firm* — Hall Estill Attorneys at Law

(57) ABSTRACT

Apparatus and method for managing data in a multi-device storage system, such as a RAID (redundant array of independent discs) system. Distributed data sets are stored across a plurality of storage devices. A selected storage device is replaced with a new storage device responsive to an anomalous event. A rebuild operation is performed to reconstruct data from the selected storage device to the new storage device. The rebuild process includes accessing a list of distributed data sets in a local memory. For each distributed data set in the list identified as constituting valid data, read commands are issued to the remaining storage devices and a write command is issued to the new storage device. For each distributed data set in the list identified as constituting unused data, a data clear command is issued to each of the remaining storage devices and to the new storage device.

20 Claims, 7 Drawing Sheets

REBUILD PROCESS – OVERVIEW

REBUILD – VALID STRIPES

REBUILD PROCESS – VALID STRIPES

REBUILD – UNUSED STRIPES

CLEAR COMMAND FORMAT

REBUILD PROCESS – UNUSED STRIPES

CODE WORDS

PARITY SET

MEMORY REALLOCATION DURING RAID REBUILD

SUMMARY

Various embodiments of the present disclosure are generally directed to the management of data in a multi-device data storage system, such as but not limited to a system employing RAID (redundant array of independent discs) techniques.

In some embodiments, distributed data sets are stored across a plurality of storage devices, such as but not limited to solid-state drives (SSDs). A selected storage device is replaced with a new storage device responsive to an anomalous event. A rebuild operation is performed to reconstruct data from the selected storage device to the new storage device.

The rebuild process includes accessing a list of distributed data sets in a local memory. For each distributed data set in the list identified as constituting valid data, read commands are issued to the remaining storage devices and a write command is issued to the new storage device. For each distributed data set in the list identified as constituting unused data, a data clear command is issued to each of the remaining storage devices and to the new storage device.

These and other features which may characterize various embodiments can be understood in view of the following detailed discussion and the accompanying drawings.

DETAILED DESCRIPTION

Figure 1:
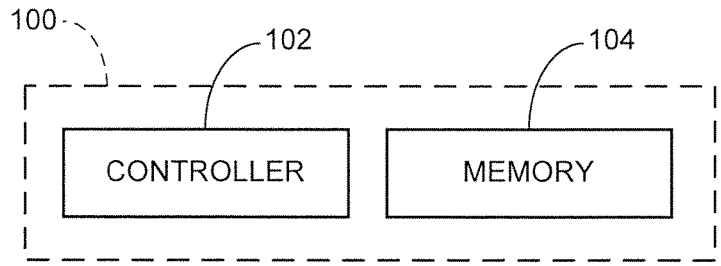
FIG. 1 provides a functional block representation of a data storage device in accordance with various embodiments.

Solid state drives (SSDs) are data storage devices that store user data in non-volatile memory (NVM) made up of an array of solid-state semiconductor memory cells. SSDs usually have an NVM module and a controller. The controller directs the transfer of user data between the NVM and a host device. The NVM will usually be NAND flash memory, but other forms of solid-state memory can be used.

NAND flash memory cells are arranged into erasure blocks, which represent the smallest grouping of memory cells that can be erased at a time. Garbage collection operations are carried out as background routines to periodically recycle the erasure blocks for reuse. A garbage collection operation generally includes searching the erasure block(s) for current version data, rewriting the current version data to a new location, and then applying an erasure operation to reset the memory cells. Erasure blocks are usually grouped into larger garbage collection units (GCUs) that incorporate erasure blocks from different dies and which can be erased and allocated as a unit.

Data storage devices such as SSDs are often incorporated into multi-device data storage systems to provide a large combined storage space to which data sets can be stored. Some systems use RAID (redundant array of independent discs) or other distributed techniques to distribute the data across multiple devices to provide a measure of fault tolerance to the system.

Depending on the configuration employed, the failure of one or more data storage devices can be compensated by initiating a rebuild operation where the data contents of the failed device(s) are reconstructed and stored in a new, replacement (spare) set of devices. While operable, there remains a continual need for improvements in the manner in which resources are reallocated during the operation of a multi-device data storage system, including but not limited to rebuild operations.

Various embodiments of the present disclosure are generally directed to an apparatus and method for managing resources in a data storage system. As explained below, some embodiments provide a plurality of data storage devices, such as but not necessarily limited to SSDs, across which data sets are stored using a storage (RAID) controller. The data sets are sometimes referred to as data stripes or RAID stripes.

The controller maintains a stripe list that records information associated with each stripe. The information includes a logical range of data blocks associated with the stripe, the storage devices (device group) employed to store the stripe, the owner (user) of the stripe, etc. The stripe list further identifies whether a particular stripe is a valid stripe or an unused stripe. Valid stripes represent sets of data that are still current or otherwise still in use by the associated user. Unused stripes represent ranges of logical blocks that are not currently in use by the system.

A rebuild operation is carried out in response to an anomalous event, such as a failure condition, that makes one or more of the storage devices no longer available for access by the controller. The rebuild operation reconstructs data previously stored on the removed device(s) and stores the reconstructed data to one or more new, replacement (spare) devices.

During the rebuild operation, the controller accesses the stripe list and evaluates each stripe in turn. For each valid stripe from the stripe list, the controller instructs the remaining storage devices in the associated device group to read the data portions (strips) associated with the stripe. The controller performs a combinatorial function (such as exclusive-or, XOR) upon the recovered data strips to generate one or more replacement strips, and then directs the spare device(s) to write the replacement strip(s).

For each unused stripe from the stripe list, the controller issues a clear command to each of the existing and new replacement devices. In response to the clear command, the existing devices mark the associated data blocks as invalid and schedule garbage collection operations on the data blocks to free up space within the associated device memory. Each of the spare devices operates in response to the clear command to perform a reallocation operation, which can include the updating of various internal data control structures, reassignments of semiconductor dies, changes in code values, changes to overprovisioning levels, changes to garbage collection unit (GCU) configurations, etc. Similar reallocations may be made by the existing devices as well.

In this way, the rebuild process is carried out faster and more efficiently because unnecessary reads, XORs and writes are not performed for unused blocks. Instead of reconstructing all of the contents from the removed device(s) onto the spare device(s), only those contents associated with currently valid data are reconstructed and stored. Since a data rebuild operation will tend to be carried out in the background while the controller is servicing other access requests, reducing the scope and extent of the rebuild process will enable the system to provide higher data transfer rate performance.

Another benefit is that the SSDs (or other storage devices) utilize the memory space that would have otherwise been reserved for the unused blocks, as identified by the clear command(s), to support new writes for existing users. From a data transfer performance viewpoint, SSDs tend to slow down significantly as the SSDs approach maximum capacity because new garbage collection operations may be required to make space to accommodate each subsequently received write command. The parametric reallocations thus enhance read/write access performance during subsequent operation after the rebuild operation is completed. The clear commands can be issued at other times as well, such as during scrub operations to verify existing data stripes.

These and other features and advantages of various embodiments can be understood beginning with a review of FIG. 1 which shows a data storage device 100. The device 100 has a controller 102 and a memory module 104. The controller 102 takes the form of one or more hardware circuits and/or one or more programmable processor circuits that use programming (e.g., firmware) in a local memory to provide top level control of data transfers between the memory module 104 and a host device. The memory module 104 includes one or more forms of non-volatile memory (NVM) for the storage of host (user) data.

Figure 2:
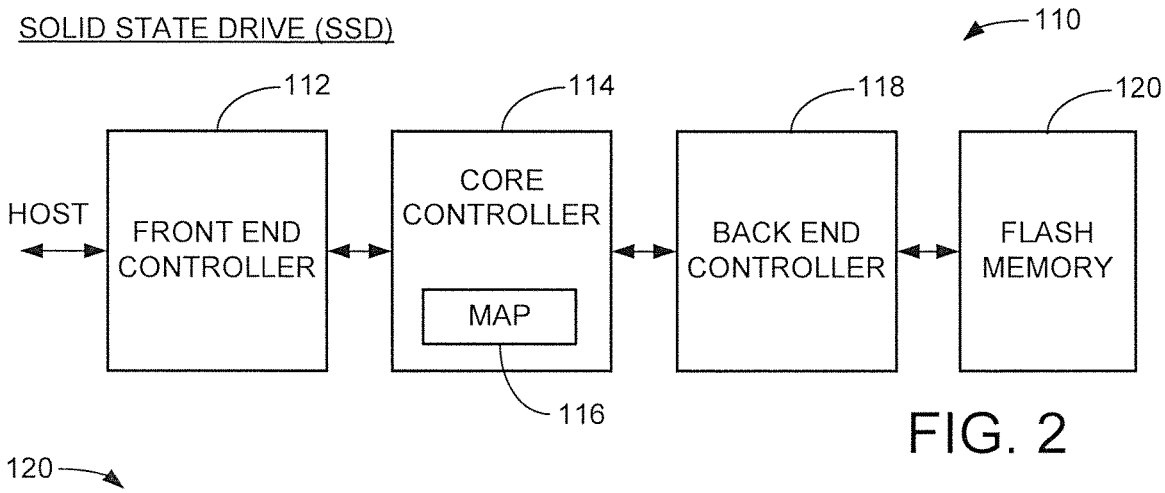
FIG. 2 shows the device of FIG. 1 characterized as a solid-state drive (SSD) in accordance with some embodiments.

FIG. 2 shows a functional block representation of a data storage device 110 as a particular embodiment of the device 100 in FIG. 1. The data storage device 110 is characterized as a solid-state drive (SSD) that uses NVM in the form of flash memory.

The controller 102 from FIG. 1 is embodied in FIG. 2 as a front end controller 112, a core controller 114 and a back end controller 116. Generally, the front end controller 112 processes commands and data with the host. The core controller 114 provides overall processing of data exchanges using various metadata structures such as map data 116 stored in local memory. The back end controller 118 interfaces with a flash memory 120. The map data 116 can include a flash transition layer (FTL) to convert logical block addresses to physical block addresses within the flash memory 120. The map data can represent other data as well, such as reverse directories stored in the flash memory that provide a physical-to-logical translation layer.

Figure 3:
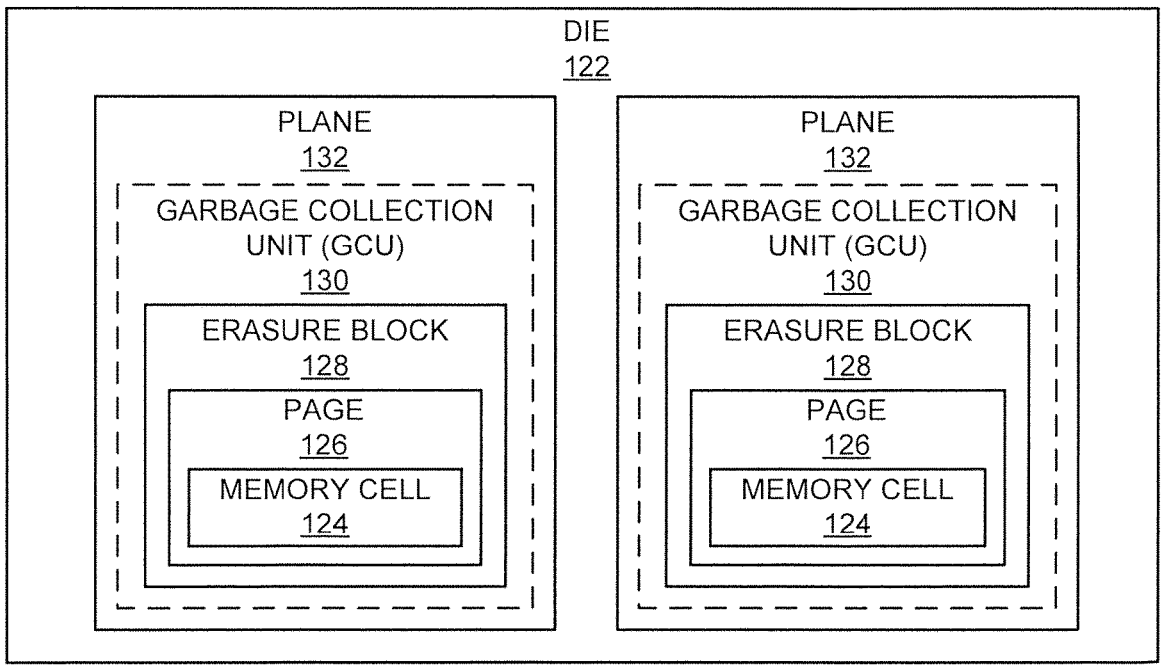
FIG. 3 shows an arrangement of the flash memory of FIG. 2 in some embodiments.

FIG. 3 shows physical and logical aspects of the flash memory 120 from FIG. 2 in some embodiments. A number of semiconductor flash dies 122 are arranged within the flash memory 120, with each die incorporating a large number of flash memory cells 124. The cells 124 may be arrayed in a two-dimensional (2D) or three-dimensional (3D stacked) arrangement with various control lines (e.g., source, bit, word lines) to access the cells.

Groups of cells 124 are interconnected to a common word line to accommodate pages 126, which represent the smallest unit of data that can be accessed at a time. While a single page of data can be written to a single row of cells (so-called SLC or single-level cells), other storage schemes allow multiple pages of data to be written to the same physical row of cells, such as in the case of MLCs (multi-level cells), TLCs (three-level cells), XLCs (four-level cells), and so on. Generally, n bits of data can be stored to a particular memory cell 124 using $2^n$ different charge states (e.g., TLCs use eight distinct charge levels to represent three bits of data, etc.). The storage size of a page can vary; some current generation flash memory pages are arranged to store 16 KB (16,384 bytes) of user data.

The memory cells 124 associated with a number of pages are integrated into an erasure block 128, which represents the smallest grouping of memory cells that can be concurrently erased in a NAND flash memory. Non-limiting examples include 256 or 512 rows of cells (SLC pages) per erasure block, etc.

Groups of erasure blocks 128 are in turn incorporated into garbage collection units (GCUs) 130, which are logical storage units that utilize erasure blocks across different dies. GCUs are allocated and erased as a unit.

During normal device operation, a selected GCU is allocated for the storage of user data. Pages of data are successively written through the programming of the memory cells in the GCU until the GCU is filled. Once a sufficient amount of the stored data is determined to be stale (e.g., no longer the most current version), a garbage collection operation can be carried out to recycle the GCU. This includes identifying and relocating the current version data to a new location, followed by an erasure operation to reset the memory cells to an erased (unprogrammed) state. The recycled GCU is returned to an allocation pool for subsequent allocation to begin storing new user data. In one embodiment, each GCU 130 nominally uses a single erasure block 128 from each of a plurality of dies 122, such as 32 dies.

Each die 122 may further be organized as a plurality of planes 132. Examples include two planes per die as shown in FIG. 3, although other numbers of planes per die, such as four planes per die, etc. can be used. Generally, a plane is a subdivision of the die 122 arranged with separate read/write/erase circuitry such that a given type of access operation (such as a write operation, a read operation, etc.) can be carried out simultaneously by each of the planes to a common page address within the respective planes.

Figure 4:
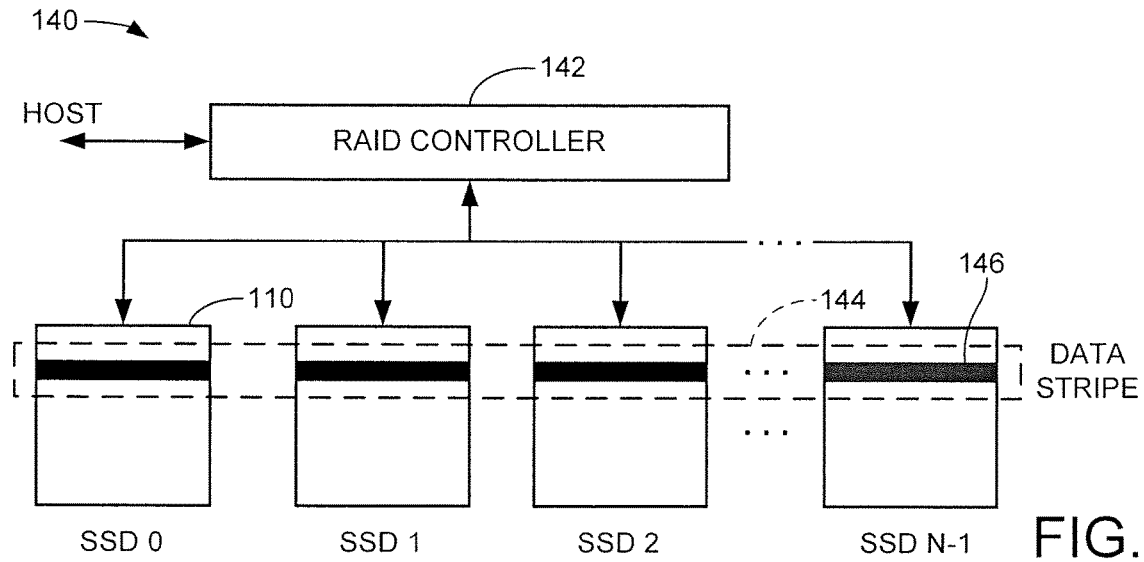
FIG. 4 depicts a multi-device RAID (redundant array of independent discs) data storage system using SSDs as in FIG. 2 in some embodiments.

FIG. 4 shows a multi-device data storage system 140 in accordance with some embodiments. The data storage system 140 incorporates a plural number N SSDs 110 from FIG. 2 to form a larger, combined data storage space. While the present example uses SSDs, it will be appreciated that other types and combinations of data storage devices, including but not limited to HDDs (hard disc drives), hybrid drives (devices using both rotatable and solid state memory), optical drives (devices that use optical recording), magnetic tape drives, etc. can be used as desired.

The storage system 140 uses a RAID (redundant array of independent discs) controller 142 to store data sets ("stripes") 144 across the multiple SSDs. That portion of the stripe 144 stored in each SSD 110 is referred to herein as a strip 146. Data groupings such as the stripe 144 are also sometimes more generally referred to herein as distributed data sets.

Any number of different RAID techniques can be used by the system of FIG. 4, including but not limited to RAID 0, 1, 5, 6, 7, 10, 50, etc. For purposes of providing a concrete example, it is contemplated that the system 140 uses RAID 5 storage techniques. As will be recognized, RAID 5 provides N-1 data strips of user data plus one (1) parity strip to form each RAID stripe. The parity strip may be formed by applying a suitable combinatorial function to the N-1 data strips, such as XOR. A RAID 5 system is thus fault tolerant up to the loss of a single storage device at a time.

Figure 5:
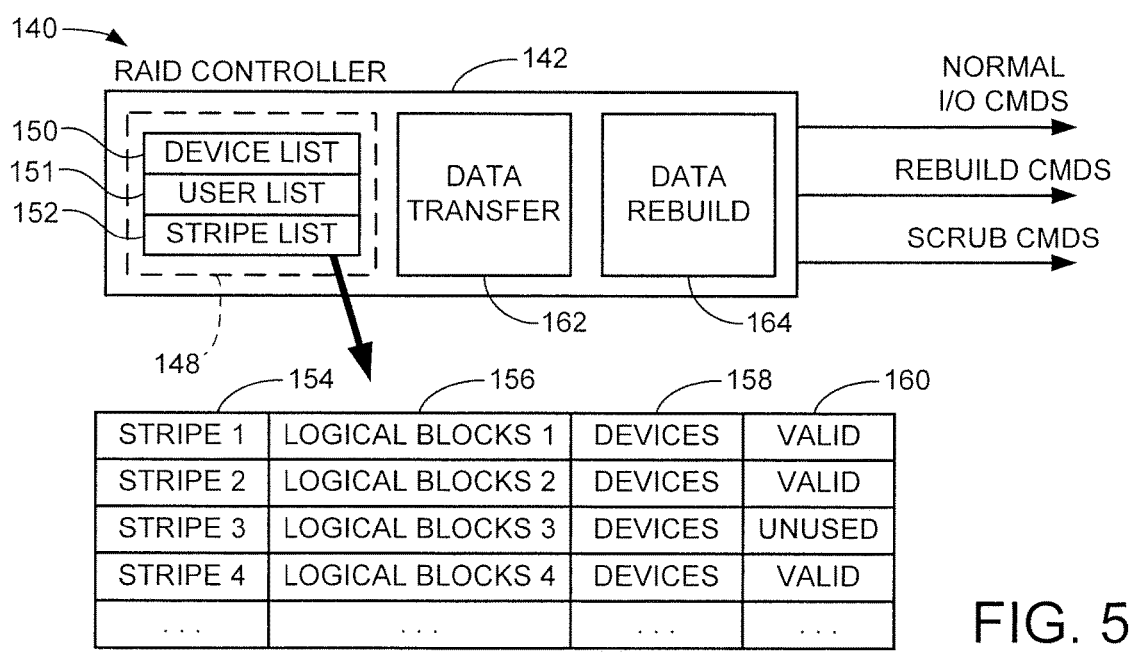
FIG. 5 shows a stripe list of the raid controller of FIG. 4 in some embodiments.

FIG. 5 shows the system 140 of FIG. 4 to illustrate aspects of the RAID controller 142 in greater detail. As with the controller 102 in FIG. 1, the RAID controller 142 can be realized using one or more hardware circuits and/or programmable processor circuits to carry out various data management and transfer functions. Three main controller command functions are illustrated in FIG. 5: normal I/O (input/output) commands which are issued to write data to and read data from the SSDs 110, rebuild commands which direct the SSDs to rebuild selected stripes, and scrub commands which direct the SSDs to perform data integrity checks on existing stripes.

These and other functions are carried out through the use of various internal metadata (control) structures maintained in a local memory 148 of the RAID controller 142. These structures include a device list 150, a user list 151 and a stripe list 152. Other forms of metadata can be used and maintained by the controller 142 as desired.

Generally, the device list 150 identifies the various storage devices (e.g., SSDs) accessible by the controller 142, including dedicated and/or global spare devices that may be used as required in the event of a failure or other event that renders an existing device unusable. In some cases, the RAID controller 142 may manage a large number P of devices of which subgroups of the devices are grouped together in different combinations to accommodate different data stripes, users, etc. The device list may thus be arranged to identify not only the total number of devices in the system, but also to identify the various device groups arranged for this purpose.

The user list 151 generally lists the users (owners) of the various devices and data, and may include various types of control data such as access levels, credentials, etc. necessary to facilitate user access to the data. It is contemplated that each user may be allocated a certain total amount of memory storage capacity in the system, which may be represented by a corresponding total number of stripes. Each stripe in the system will thus have one user that owns the data stored in the stripe; however, a particular device group may store stripes that are owned by different users.

The stripe list 152 is of particular interest to the present discussion. An exemplary format for the stripe list 152 is provided in FIG. 5, although this is merely illustrative and other formats can readily be used as desired. Generally, the stripe list 152, also sometimes referred to as a list of distributed data sets, is a listing of all stripes 146 controlled by the RAID controller 142. The stripe list may be arranged as a sequence of entries (rows), with each entry having a number of fields including a stripe ID field 154, a logical block range field 156, a devices field 158 and a user status field 160.

The stripe field 154 uniquely identifies each stripe by a suitable identifier. For ease of illustration, the stripes are numerically incremented in FIG. 5 as Stripe 1, 2, 3, 4, and so on. The range field 156 identifies the logical blocks assigned to the associated stripe. These may be identified in any number of ways such as logical block addresses, virtual block addresses, key-block addresses, etc. Generally, the addressing provided in the range field 156 will be at the host level and will be logical in nature (e.g., not necessarily tied to a specific memory location).

The devices field 158 can be used to identify the associated devices which store portions (e.g., the strips 146) for the associated stripe 144. The user status field 160 provides a status to the RAID controller 142 of the current status of each of the various stripes 144. The format shown in FIG. 6 provides two alternative statuses: either the data in a particular stripe are valid as currently belonging to an authorized user, or the data in the particular stripe are unused as either being released from, or not yet allocated to, a current user.

The metadata structures 148, 150 and 152 are used by the RAID controller 142 for each of the depicted functions shown in FIG. 5. During a normal data I/O transfer, a data transfer circuit 162 of the RAID controller 142 will access the stripe list 152 to identify the location of a given stripe, and use this to direct various transfer commands with the SSDs associated with that stripe.

If the I/O transfer is a read operation to return the stripe data to the user, the controller 142 will generally operate to issue read commands for the associated strips 146 from each of the SSDs 110 to recover the N-1 data strips and the parity strip, confirm the integrity of the data by recalculating the parity and comparing the recalculated parity to the retrieved parity, correct any detected errors, and forward the retrieved data to the requesting host. If the I/O transfer is a write operation to write updated user data to the stripe, the controller 142 may carry out a read/modify/write sequence to read the strips, update the new data blocks, calculate new parity, and store the updated stripe to the SSDs. Other processing sequences are contemplated and can be used as desired.

Figure 6:
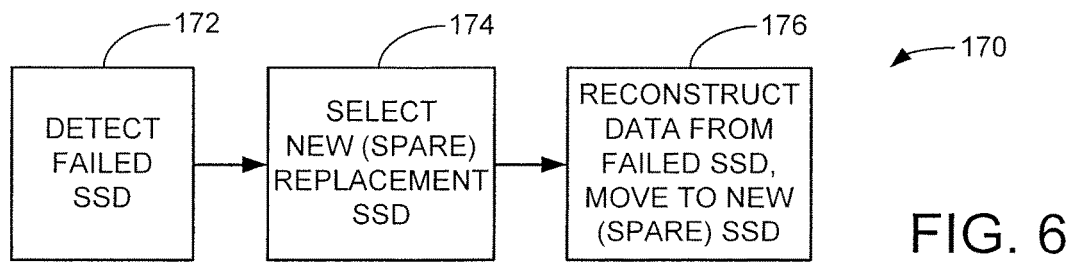
FIG. 6 is a flow sequence for a rebuild process carried out by the raid controller.

FIG. 6 depicts a flow diagram 170 for a rebuild process carried out by a data rebuild circuit 164 of the controller 142 in some embodiments. As noted above, the rebuild process is carried out to reconstruct data from a failed (or otherwise removed) device to a replacement device.

The flow begins at block 172 with the detection by the controller of a failed SSD. Upon this detection, the controller 142 selects a new replacement (spare) SSD, block 174, such as through access to the device list 148. It is contemplated that spare devices will already be present in the system awaiting selection for use as needed. However, in some cases it is possible that user intervention may be required to provide the replacement device.

The controller 142 next operates to direct a reconstruction of the data from the failed SSD for storage to the new SSD, block 176. The RAID controller 142 accesses and uses the stripe list 152 during this portion of the rebuild process, as will now be described by FIGS. 7-11.

Figure 7:
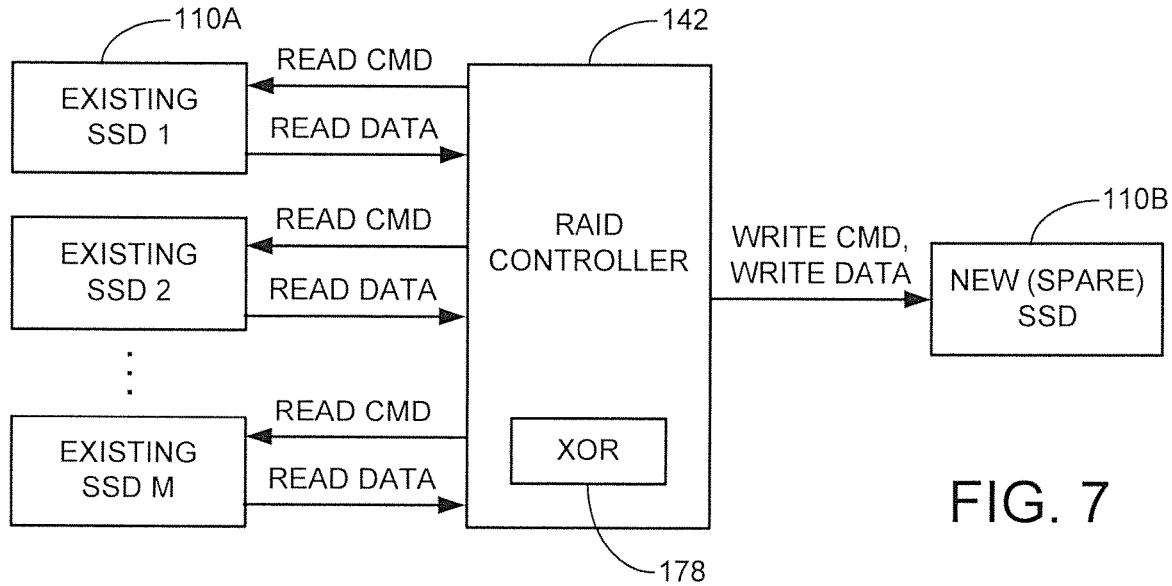
FIG. 7 shows the RAID data storage system during the rebuilding of valid data stripes during the rebuild process of FIG. 6.

FIG. 7 shows the system 140 during those portions of the rebuild process in which valid stripes from the stripe list 152 are processed. FIG. 7 shows a number M of existing SSDs 110A, which represent the SSDs from FIG. 4 that are still operable after the failure event. A new (spare) SSD 110B represents the replacement SSD to which the reconstructed data will be stored.

Generally, the RAID controller 142 issues read commands to each of the existing SSDs 110A as described above to read back the associated strips 146. These strips are combined by an XOR block 178 to provide a new strip, which is supplied to the new SSD 110B. It will be appreciated that the new strip may represent either one of the N-1 data strips or the one parity strip from FIG. 4, since RAID-5 is fault tolerant up to the failure of a single device, so that either data or parity strips can be reconstructed.

Figure 8:
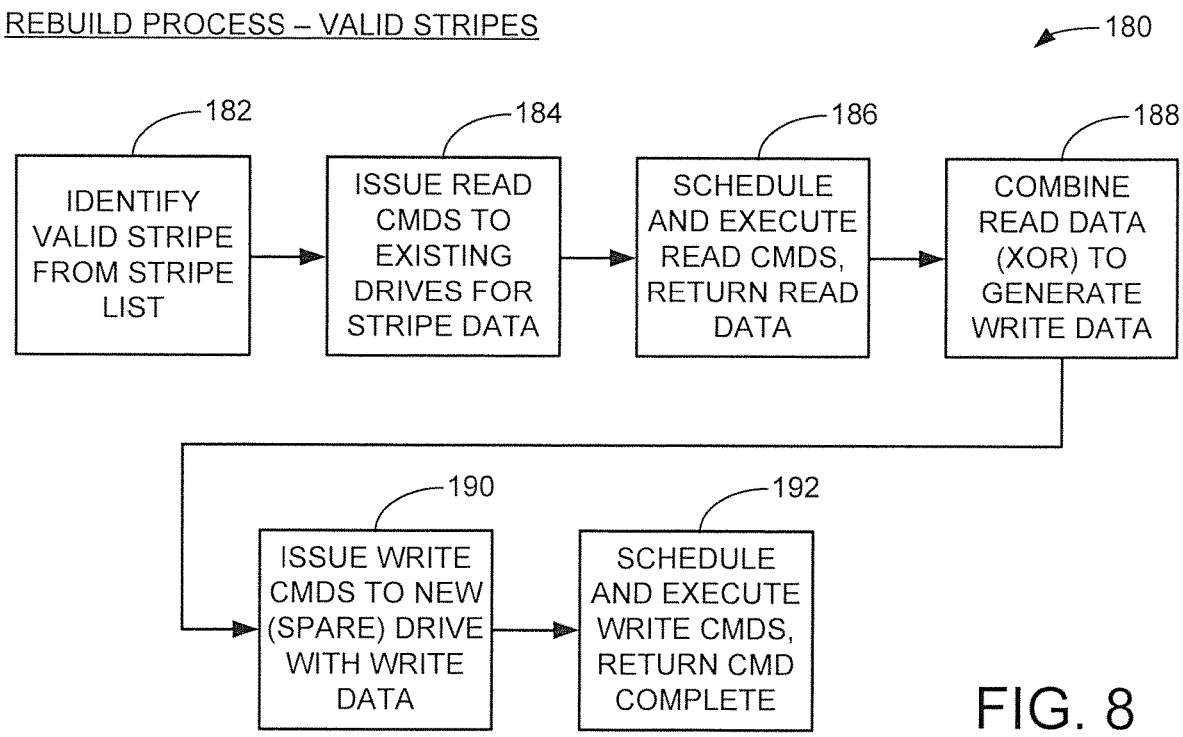
FIG. 8 is a flow sequence corresponding to FIG. 7.

FIG. 8 provides a flow diagram 180 for the rebuild processing of FIG. 7. At block 182, the RAID controller 142 identifies the next entry in the stripe list 152 as a valid stripe (see FIG. 6). In response, the controller 142 issues read commands to retrieve the existing strips from the existing devices 110A at block 184. The existing devices schedule and execute the associated read commands and returns the requested data, block 186. Depending on the respective sizes of the stripes, multiple successive read commands may be issued to the storage devices to recover each strip.

At block 188, the RAID controller 142 combines the read data from the existing SSDs 110A using the XOR block 178 to generate reconstructed write data. A write command with the associated write data are thereafter issued to the new SSD 110B at block 190. In response, the new SSD 110E schedules and performs the write operation and returns a successful completion status to the controller, block 192.

The foregoing operations described in FIGS. 7 and 8 are carried out for each valid stripe in the stripe list 152. It is contemplated that different existing SSDs may be accessed for different stripes, depending on the grouping of the devices within the system. While a single spare SSD 110B is shown, it will be appreciated that the reconstructed data associated with different stripes may be stored to different devices including additional spares.

Figure 9:
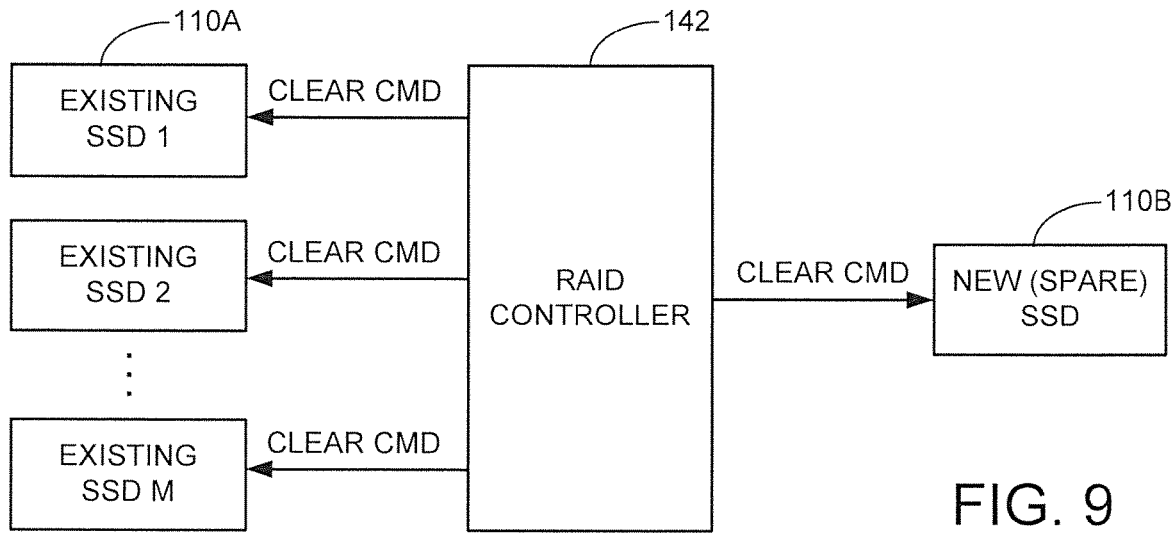
FIG. 9 shows the RAID data storage system during the processing of unused data stripes during the rebuild process of FIG. 6.
Figure 10:
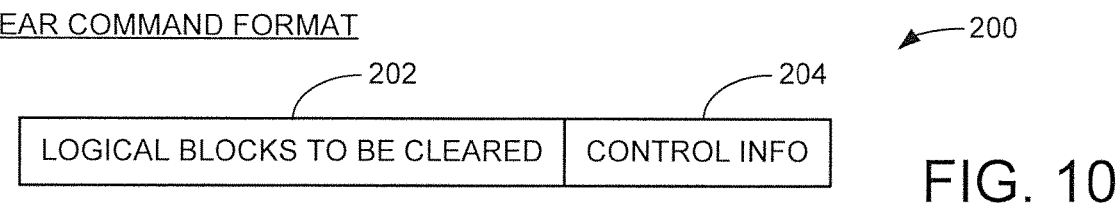
FIG. 10 shows an exemplary format for a clear command from FIG. 9.

FIG. 9 shows another diagram of the system 140 to illustrate the handling of unused stripes from the stripe list 152 during the rebuild process. As noted above, unused stripes may represent blocks of data that were previously stored to the SSDs, but have since been released and are therefore no longer current data. While this information is reflected in the stripe list, such information may not yet have been conveyed to the individual storage devices, so that the devices continue to maintain the unused blocks in an available state.

For each unused stripe in the stripe list, the RAID controller 142 issues a clear command to each of the existing SSDs 110A as well as to each of the new SSDs 110B. The clear command can take any number of suitable forms. One exemplary format for the clear command is shown at 200 in FIG. 10, although this is merely for purposes of illustration and is not limiting.

The command 200 includes a clearance range field 202 and other control information field 204. The range field 202 identifies the logical block addresses of the blocks to be cleared from the existing SSDs and the new SSD. These correspond to the same types of addresses issued during the rebuilding process of FIGS. 7-8 for the valid stripes 144. The control information field 204 can include additional information useful to the various SSDs 110A, 110B, such as the associated stripe ID, the user (including a previous user that is now removed from the system), the indication that these blocks are being cleared for a particular reason (e.g., release of a previous user), etc.

In this way, the clear command can be considered as being analogous to a TRIM command (used in the ATA command set), an UNMAP command (used in the SCSI command set), a DELETE command (useful in Linux operating systems), and so on. However, instead of merely identifying existing blocks of data stored in the respective memories of the SSDs (e.g., flash memory 120, FIGS. 2-3) that can now be garbage collected, the clear command is used by various embodiments at the storage device level to initiate reallocation of the existing memory to enhance subsequent data transfers.

Figure 11:
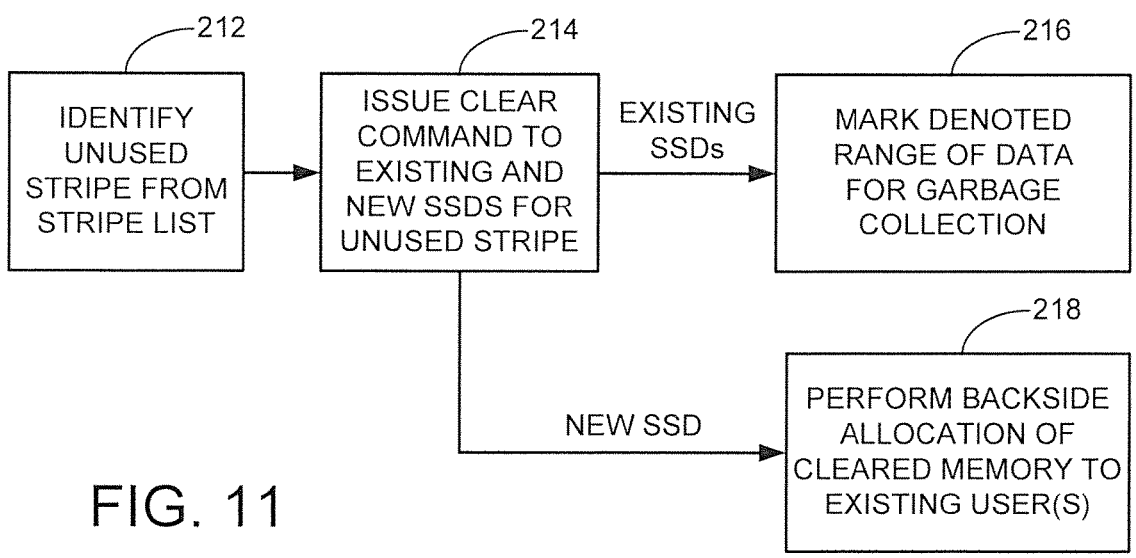
FIG. 11 is a flow sequence corresponding to FIG. 9.

FIG. 11 shows a flow diagram 210 for the operation of the system in FIG. 9 to process each unused stripe in the stripe list 152. At block 212, the RAID controller 142 operates to initially identify the next entry in the list as identifying an unused stripe. It is contemplated that in at least some circumstances the stripe will have been previously stored as a valid stripe by the SSDs 110 in the associated device group, so that data associated with the stripe remain stored within the existing SSDs 110A as valid data. Of course, no such data will be present on the new SSD(s) 110B.

The flow passes to step 214 where the RAID controller 142 sends the clear command to both the existing and new SSDs 110A, 110B. The existing SSDs 110A mark the denoted range of blocks in the clear command for garbage collection, as shown by step 216. The new SSD(s) 110B perform a backside allocation of a portion of memory corresponding to the size of the strip for better use, such as to one or more existing users in the system, block 218. As desired, the existing SSDs 110A may perform a similar reallocation operation as well.

Figure 12:
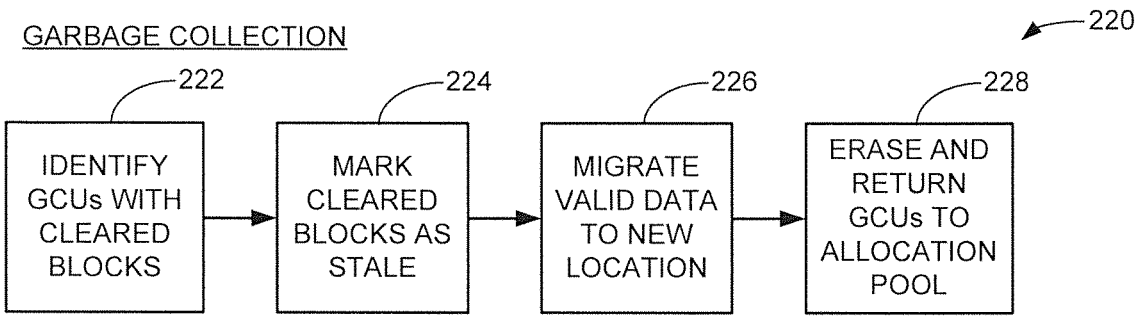
FIG. 12 is a flow sequence for a garbage collection operation.

A garbage collection routine 220 is shown in FIG. 12. The garbage collection operation is carried out in response to receipt of the clear command from FIG. 11. Block 222 shows operation of the associated SSD controller, such as the core controller 114 (FIG. 2), in accessing metadata to identify one or more existing GCUs 130 (FIG. 3) that have versions of the unused data blocks ("cleared blocks") identified by the clear command. This may involve indexing a selected range of LBAs (logical block addresses) from the clear command into the FTL (flash transition layer) map structure 116 to locate the physical addresses of the blocks. Other data structures such as reverse directories may be consulted as well in order to locate the data.

In some cases, the GCUs in which the cleared blocks are stored may not be ripe for a garbage collection operation at this time, so at this point it may be sufficient to mark the cleared blocks as invalid blocks in the system, block 224. At such time that the SSD controller is ready to perform garbage collection upon the associated GCUs, the flow passes to block 226 where valid data blocks in each GCU are migrated to a new location (such as a new GCU). The erasure blocks 128 in the respective GCUs 130 are thereafter erased, block 228, and the erased GCUs are returned to an allocation pool for storage of new data.

Figure 13:
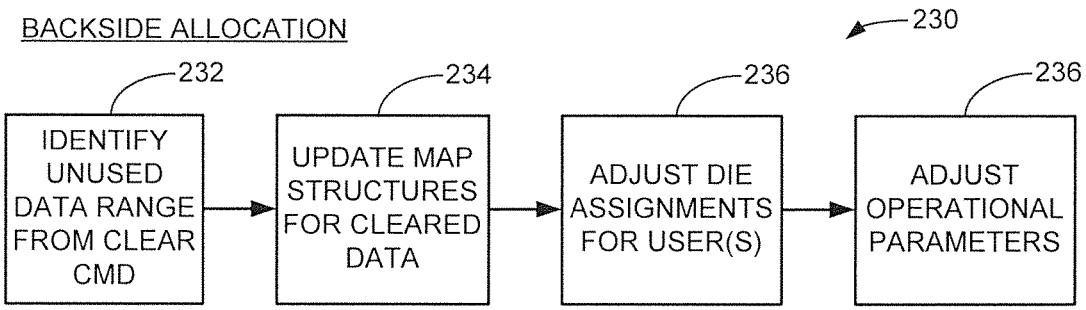
FIG. 13 is a flow sequence for a backside allocation operation.

FIG. 13 shows a backside allocation flow 230 carried out by the new SSDs 110B in response to the clear command(s) received during the rebuild process. As the term is used herein, "backside allocation" generally describes a number of different types of adjustments that can be made by the new SSD as a result of the clear command information. In some cases, the results of multiple clear commands for different stripes may be accumulated, after which the new device performs the flow 230 based on all of the information supplied by the accumulated commands at the conclusion of the rebuild process.

For each clear command, the SSD controller identifies the unused data range, block 232. A first type of adjustment is shown at block 234, where map structures within the device are updated to denote these blocks as currently unused based on the indicated cleared status. A special status in the map data can be provided to indicate that, at least for now, these blocks will not be serviced either from a write or read standpoint, freeing the space for other uses.

Block 236 shows a second type of adjustment which involves a reallocation of existing dies (or other memory units) within the flash memory 120 to different users, existing processes, etc. A third type of adjustment is shown at block 236 where various operational parameters are changed. Other forms of backside allocations can be carried out as well, so that these are merely exemplary and are not limiting. Each form of adjustment will now be briefly discussed.

Figure 14:
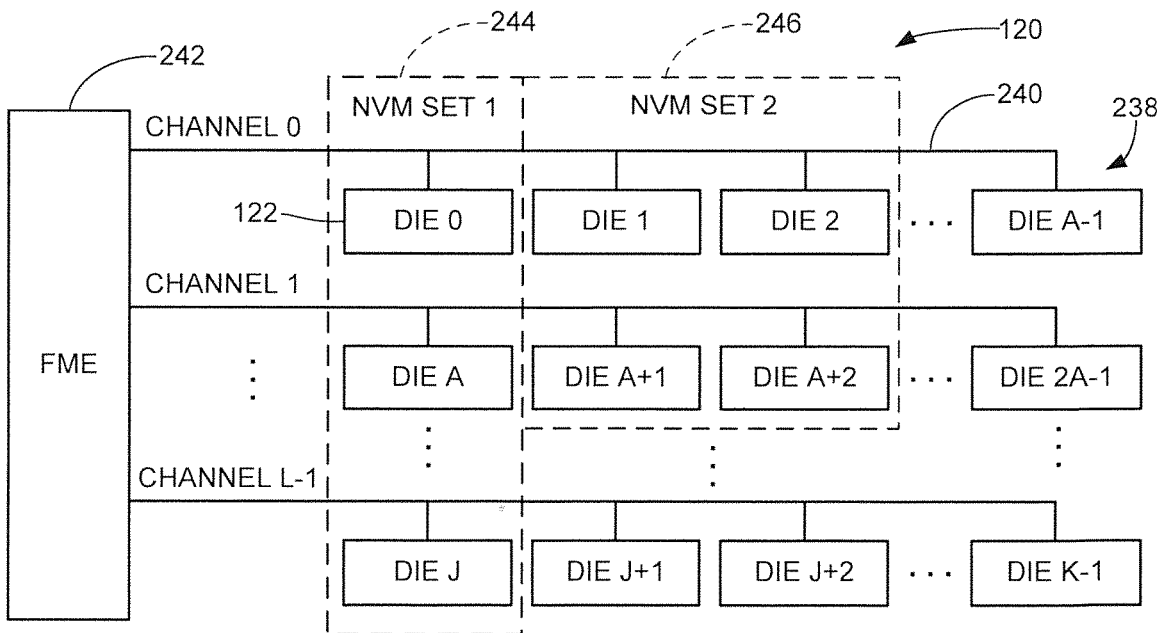
FIG. 14 illustrates the arrangement of the flash dies from FIG. 3 into die sets in accordance with the NVMe (Non-Volatile Memory Express) specification.

FIG. 14 shows further aspects of the flash memory 120 from FIGS. 2-3 in some embodiments. A total number K semiconductor memory dies 122 are provided and arranged into physical die groups 238. Each die group 238 is connected to a separate channel 240, or lane, representing an internal data bus that links each of the dies in each group to flash memory electronics (FME) circuitry 242. A total of A dies are shown connected to each of L channels. In one example, K is set to 128 dies, L is set to 8 channels, and each physical die group has 16 dies. In this way, any of the 16 dies physically connected to a given channel can be accessed at a given time using the associated channel. Generally, only one die per channel can be accessed at a time. Other respective numbers of dies and channels can be arranged as desired.

In some embodiments, the various dies are arranged into one or more NVM sets. An NVM set, also referred to a die set, represents a portion of the storage capacity of the SSD that is allocated for use by a particular host (user/owner). NVM sets are established with a granularity at the die level, so that each die set will encompass a selected number of the available dies 144. In some cases, the die sets can be established and operated in accordance with the NVMe (Non-Volatile Memory Express) specification that enables high speed data transfers using one or more PCIe (Peripheral Component Interface Express) host interface connections. As will be recognized, the NVMe specification allows a controller to divide the combined memory space of the NVM provided by the storage devices into a number of NVMe namespaces, each namespace associated with a different user and having an associated overall amount of namespace data capacity.

A first example NVM set is denoted at 244 in FIG. 14. This first set 244 uses a single die 122 from each of the different channels 240. This arrangement provides fast performance during the servicing of data transfer commands for the set since all eight channels are used to transfer the associated data to service a host access command. A limitation with this approach is that if the set 244 is being serviced, no other NVM sets can be serviced during that time interval. While the set 244 only uses a single die from each channel, the set could also be configured to use multiple dies from each channel, such as four (4) dies per channel for a total of 32 dies in each NVM set.

A second example NVM set is denoted at 246 in FIG. 14. This set uses dies 122 from less than all of the available channels 240. This arrangement provides relatively slower overall performance during data transfers as compared to the set 244, since for a given size of data transfer, the data will be transferred using fewer channels. However, this arrangement advantageously allows the SSD to service multiple NVM sets at the same time, provided the sets do not share the same (e.g., an overlapping) channel. While only two (2) dies from each channel are used, any number of dies from each channel can be used including all of the dies connected to each channel (e.g., NVM sets of 32 dies each).

It follows that depending on the amount of data cleared by the clear commands received by the new SSD 110B, adjustments in the size or arrangement of the NVM sets may be internally made by the SSD controller to optimize subsequent data transfers. For example, a first arrangement of die sets may be made to accommodate a selected number B users based on initial configuration information conveyed to the new SSD by the RAID controller. Based on the information gleaned from the clear commands, however, a more optimum grouping of dies may be provided by the new SSD to accommodate the B users.

Figure 15:
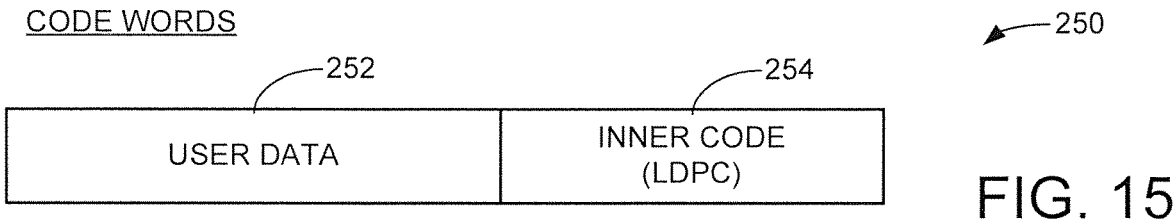
FIG. 15 illustrates a format for code words written to the NVM of the various SSDs in some embodiments.

FIG. 15 illustrates a manner in which user data are stored to the flash memory 120 in accordance with further embodiments. Fixed sized code words 250 are formed from blocks of user data, shown at 252, which are appended with so-called inner codes such as LDPC (low density parity check) code bits for error detection and correction during writing and reading to the flash memory. The number of code bits will vary, but may be on the order of about 10 KB or so for 16 KB of user data per page, depending on the construction of the flash memory. As will be recognized, LDPC codes enable fast detection and correction of read errors during a read operation. The inner codes 254 may be generated by the back end controller 118 (see FIG. 2) in preparation of writing of the data to the flash memory 120.

Figure 16:
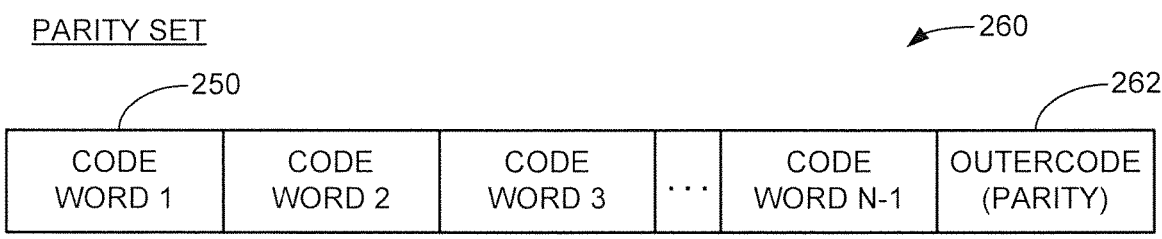
FIG. 16 depicts a format for parity sets written to the NVM of the various SSDs in some embodiments.

As shown in FIG. 16, the code words 250 are grouped together to form a parity set 260 having N elements. Nominally, the value N will be based on the number of erasure blocks 128 in a given GCU 130, although this is not necessarily required. For the present example, it is contemplated that N=32 although other numbers of elements can be used. As shown in FIG. 16, the parity set 260 will have N-1 code words 250 (e.g., N-1=31) plus an appended outercode (parity) value 262. Each of the various code words 250 and the associated outercode value 262 are written as a different page of data in the GCU.

Without limitation, in one embodiment the outercode value 260 represents the output of an exclusive-or (XOR) function applied to the N-1 code words 250. In this way, the data from the parity set can be reconstructed even in the event of a single die failure. It follows that nominally 16 KB of parity data protects (16 KB)(31)=496 KB of user data in each parity set 260, for an overhead ratio of about 3.2% for the outercode.

Figure 17:
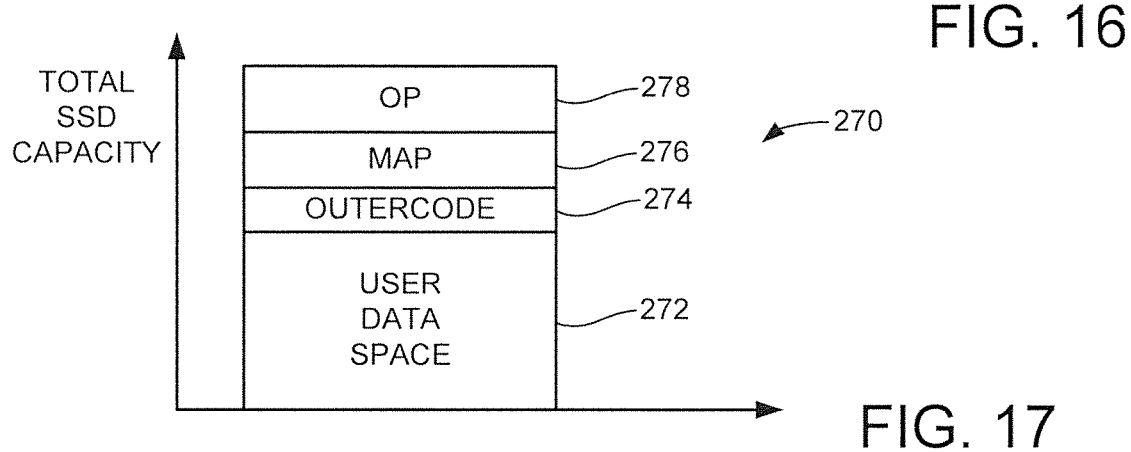
FIG. 17 shows a memory allocation diagram for the NVM of a selected SSD.

FIG. 17 is a memory allocation diagram 270 to provide a simplified representation of the various types of data stored in the flash memory 120 of the various SSDs 110 discussed herein during operation. The diagram is not necessarily represented to scale. A user data space 272 represents the largest amount of available flash memory for the storage of user data (e.g., the code words from FIG. 15). Outercode space 274 represents the space required to store the outercode 262. Map space 276 represents the space required to store the map data 116 (FIG. 2) including the FTL, reverse directory information, etc. Depending on granularity, the map and related metadata may consume around 1-3% of the total space.

An additional space referred to as OP (overprovisioning level) is represented at 278. Generally, OP is necessary to enable the SSD to operate at a selected performance rate, and constitutes overprovisioned or extra space within the SSD to enable the operation of garbage collection and other operations. OP levels can vary widely depending on the configuration of the SSD, but values of from as low as around 7% to upwards of about 20% have been used in some cases.

Figure 18:
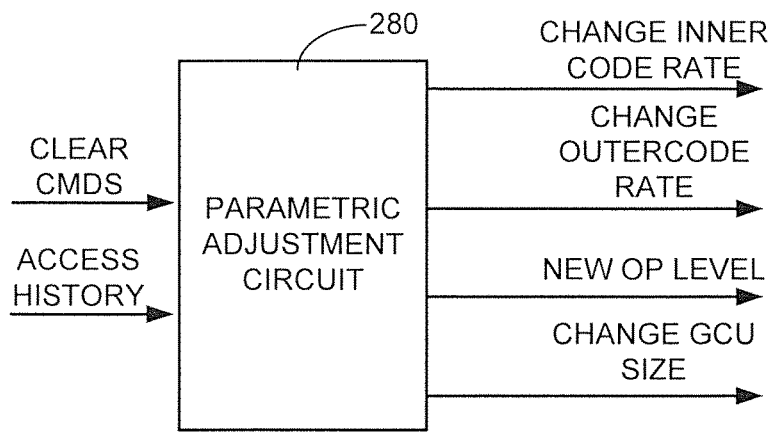
FIG. 18 illustrates a parametric adjustment circuit of the SSD controller of a selected SSD in some embodiments.

It follows that the new SSDs 110B, as well as the existing SSDs 110A, can operate responsive to the clear commands received during the rebuild process to adjust these various parameters to enhance data transfer rate performance. FIG. 18 shows a parametric adjustment circuit 280 in accordance with further embodiments. The circuit 280 can form a portion of the associated SSD controller and can use a number of inputs including clear commands as well as monitored access history of host activity over time.

Generally, the circuit 280 can operate to make adjustments (either up or down) to the inner code rate, thereby using more or fewer LDPC bits, changing to a different encoding scheme, etc. Similarly, adjustments can be made to the outercode rate including changing the total number of elements in each parity set. For example, the extra space provided by the unused blocks, as signified by the clear commands, can enable the SSD to change the size of the parity sets from 32 elements to a lower number, such as 30 elements, etc. It will be appreciated that both the inner codes and outercodes represent error correction codes used by the associated storage devices to detect and correct errors.

The freed up space associated with the unused blocks as identified by the clear command(s) can further be used to enhance the overall amount of OP in the system, so that the extra space is not allocated specifically for the storage of new data, but instead represents the amount of additional space that will be maintained within the memory to support garbage collection. This can advantageously increase the overall average data transfer rate since, on average, fewer garbage collection operations will be required to accommodate the writing of new data.

Finally, FIG. 18 shows a change in GCU size which can also be carried out in further embodiments. In some cases, GCUs may be expanded to encompass additional dies, erasure blocks, etc. to facilitate more efficient operation. It will be noted that changes in the number of dies in each GCU may be made independently of the inner code and outercode code rates applied to the data stored in the GCUs. In one example, due to die failures a given set of GCUs may be arranged to only span 31 dies. If sufficient data are cleared by the clear commands, the SSD may allocate an existing die to increase the size of certain GCUs to span 32 dies. It is up to the SSD controller to further make the determination to change the inner or outer code rates to take advantage of the enhanced GCU size.

In some cases, the circuit 280 can accumulate the frequency and number of clear commands to assess a total amount of available space that has been freed by such commands, and make these and other adjustments in view of the total amount of cleared space. It is expected in high data throughput environments that the system 140 will endeavor to maintain the various SSDs at as high a total capacity (e.g., will endeavor to maintain the SSDs in a "full" condition) as is practical. It follows that these and other types of internal adjustments can be carried out by the SSDs to meet the system level capacity requirements while providing internal allocations of resources that will enhance the ability of the device to service the users of the stored data.

The discussion to this point has generally focused on the use of the clear commands during rebuild operations where one or more new replacement devices are added to an existing device group. Similar processing can be applied at other times as well, such as during the scrub commands from FIG. 5.

Figures 19, 20:
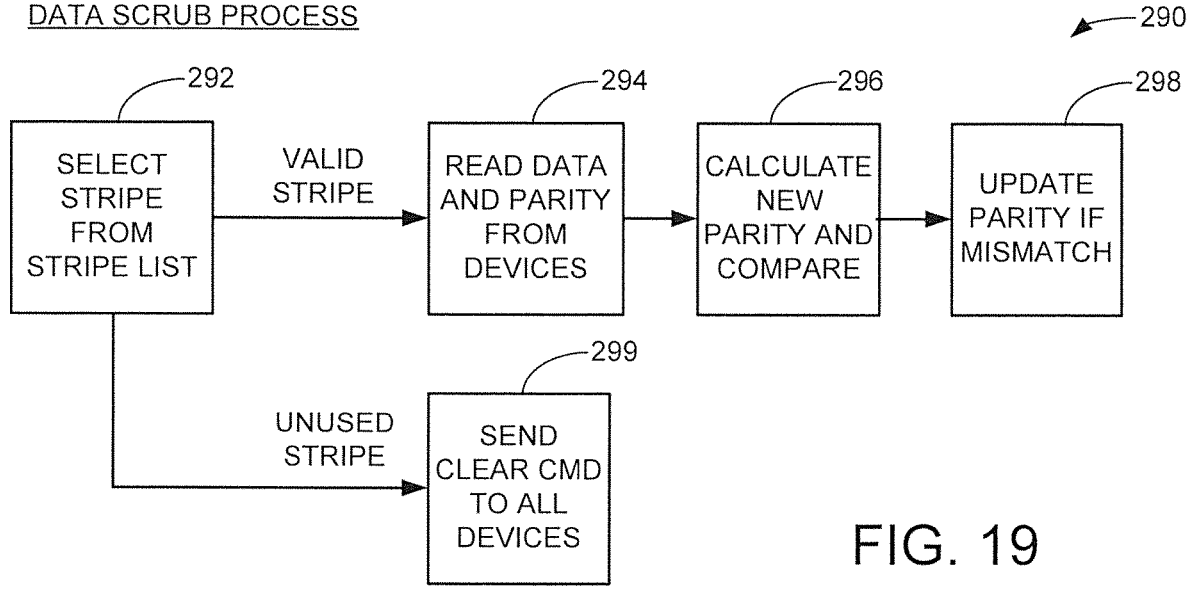
FIG. 19 is a flow sequence for a data scrub operation carried out by the RAID controller in further embodiments.
FIG. 20 shows a device list maintained by the RAID controller in further embodiments.

FIG. 19 shows a data scrub process flow 290 in accordance with further embodiments. The data scrub process generally operates to verify existing stripe data through device and parity checks, etc. At block 292, the RAID controller 142 selects a stripe from the stripe list 152. If the stripe is a valid stripe, a verification process may occur including reading the existing data, block 294, recalculating the parity and comparing to the existing parity, block 296, and updating the parity or taking other corrective actions in the event of a mismatch. If the stripe is an unused stripe, the RAID controller may operate to send a clear command to each of the devices, block 299, for the data in the unused stripe. The various devices can operate to carry out internal reallocations of resources as described above.

FIG. 20 shows a device list 300 in further embodiments. The device list 300 may correspond to the device list 150 from FIG. 5 and generally operates to identify device groups among various devices within the system 140.

In the example of FIG. 20, a total of 10 operational storage devices D0-D9 along with two available spares D10-D11 are provided. Across these devices are stored various device groups including groups G1-G5. While not limiting, in this case the various device groups use different combinations of the devices for balancing purposes. It can be seen from FIG. 20 that the failure of any one of the active storage devices D0-D9 will affect at least three (3) of the device groups. For example, should device D9 fail, then the various stripes stored in groups G1, G3 and G4 would need to be evaluated for storage in one or more of the spares D10 and/or D11.

The decision on which spare device(s) to select will be made by the RAID controller 142. However, once this decision is made and the rebuild process begins, the fact that the RAID controller issues clear commands to the new spare device(s) allows the new spare device(s) to use the information gleaned from the clear commands to best reallocate resources to enhance future performance.

While the various embodiments have been described in terms of SSDs, other types of storage devices and operational environments can be used as desired. Flash memory is a particularly suitable NVM, but other forms of data storage memory can be used.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:
1. A method comprising:
storing each of a plurality of distributed data sets across a plurality of storage devices each having a non-volatile memory (NVM);

replacing a selected storage device with a new storage device responsive to an anomalous event; and performing a rebuild operation to reconstruct data from the selected storage device to the new storage device by accessing a list of distributed data sets in a local memory and, for each distributed data set in the list identified as constituting valid data, issuing read commands to the remaining storage devices and a write command to the new storage device, and, for each distributed data set in the list identified as constituting unused data, issuing a data clear command to each of the remaining storage devices and to the new storage device, wherein responsive to the clear command each of the remaining storage devices marks an associated set of data blocks stored in the associated NVM for garbage collection and the new storage device performs a backside allocation adjustment of the associated NVM of the new storage device, the backside allocation adjustment comprising adjusting at least a selected one of an allocation of semiconductor memory dies of the NVM of the new storage device to a selected user, an inner code rate, an outercode rate, or a size of a garbage collection unit (GCU) comprising a plurality of erasure blocks that are erased and allocated as a unit.

2. The method of claim 1, wherein responsive to the read commands of the performing step, each of the remaining storage devices transfer portions of the distributed data set to a local controller memory, wherein the method further comprises applying a combinatorial logic function to combine the transferred portions to generate a reconstructed data portion, and wherein the write command of the performing step comprises a command to write the reconstructed data portion to the new storage device.

3. The method of claim 1, wherein a first selected number of the semiconductor dies of the NVM of the new storage device are initially allocated to the selected user, and wherein a different second selected number of the semiconductor dies are allocated to the selected user responsive to an overall number of unused blocks identified by each of the clear commands issued to the new storage device.

4. The method of claim 1, wherein the inner code rate represents LDPC (low density parity code) bits appended to each page of user data written to the NVM of the new storage device, wherein a different number of the LDPC bits are used responsive to the receipt of at least one clear command by the new storage device.

5. The method of claim 1, wherein the outercode rate represents a total number of code words having user data written to the NVM of the new storage device for which a parity value is calculated in a parity set, and wherein a different number of the code words is used in each parity set responsive to the receipt of at least one clear command by the new storage device.

6. The method of claim 1, wherein a first number of erasure blocks is initially assigned to the GCU in the NVM of the new storage device, and wherein the GCU is adjusted to have a different, second number of erasure blocks responsive to receipt of at least one clear command by the new storage device.

7. The method of claim 1, wherein the list of distributed data sets is characterized as a stripe list comprising a plurality of entries, each entry associated with a different stripe having an associated logical range of data blocks written to a corresponding group of the storage devices.

8. The method of claim 1, wherein the clear command identifies a selected logical range of data blocks that are currently unused by a user of the storage devices.

9. The method of claim 1, wherein each of the storage devices is characterized as a solid-state drive (SSD), the associated NVM comprises flash memory, and each of the distributed data sets comprises a RAID (redundant array of independent discs) stripe comprising N-1 data strips each written to a selected one of a corresponding N-1 of the storage devices and a parity strip written to a remaining one of the storage devices.

10. A system comprising:

a plurality of data storage devices each comprising a device controller circuit and a non-volatile memory (NVM); and a system controller circuit configured to store each of a plurality of distributed data sets across the data storage devices during a normal mode of operation and to perform a rebuild operation to reconstruct data previously stored on a selected data storage device removed from service and store the reconstructed data to a new data storage device by accessing a list of the distributed data sets in a local memory and, for each distributed data set in the list identified as constituting valid data, issuing read commands to the remaining data storage devices and a write command to the new data storage device, and, for each distributed data set in the list identified as constituting unused data, issuing a data clear command to each of the remaining data storage devices and to the new data storage device, the device controller circuit of the new data storage device adjusting at least one operational parameter associated with the NVM of the new data storage device responsive to a total amount of available space freed by the data clear commands from the system controller circuit for the distributed data sets in the list identified as constituting unused data.

11. The system of claim 10, wherein the device controller circuit of the new data storage device adjusts the at least one operational parameter associated with the NVM by adjusting a total number of semiconductor memory dies of the NVM of the new data storage device for use by a selected user.

12. The system of claim 10, wherein the device controller circuit of the new data storage device adjusts the at least one operational parameter associated with the NVM by adjusting an overprovisioning (OP) level of the NVM of the new storage device.

13. The system of claim 10, wherein the device controller circuit of the new data storage device adjusts the at least one operational parameter associated with the NVM by adjusting an error correction code rate of the NVM of the new storage device.

14. The system of claim 10, wherein the device controller circuit of the new data storage device adjusts the at least one operational parameter associated with the NVM by changing a total number of erasure blocks in a selected garbage collection unit (GCU) of the NVM of the new storage device.

15. The system of claim 10, wherein responsive to the clear command each of the remaining data storage devices marks a corresponding number of blocks in the associated NVM for garbage collection and performs a memory reallocation adjustment of the associated NVM.

16. The system of claim 10, wherein responsive to the clear command each of the remaining data storage devices marks an associated set of data blocks stored in the associated NVM for garbage collection and, and wherein responsive to the clear command the device controller circuit of the new data storage device performs at least a selected one of adjusting an allocation of semiconductor memory dies of the NVM of the new storage device to a selected user, an inner code rate, an outercode rate, or a size of a garbage collection unit (GCU) comprising a plurality of erasure blocks that are erased and allocated as a unit.

17. The system of claim 16, wherein a first selected number of the semiconductor dies of the NVM of the new data storage device are initially allocated to the selected user, and wherein a different second selected number of the semiconductor dies are allocated to the selected user responsive to an overall number of unused blocks identified by each of the clear commands issued to the new data storage device.

18. The system of claim 16, wherein the inner code rate represents LDPC (low density parity code) bits appended to each page of user data written to the NVM of the new data storage device, wherein a different number of the LDPC bits are used responsive to the receipt of at least one clear command by the new data storage device, wherein the outercode rate represents a total number of code words having user data written to the NVM of the new data storage device for which a parity value is calculated in a parity set, and wherein a different number of the code words is used in each parity set responsive to the receipt of the clear commands by the new data storage device.

19. The system of claim 16, wherein a first number of erasure blocks is initially assigned to the GCU in the NVM of the new data storage device, and wherein the GCU is adjusted to have a different, second number of erasure blocks responsive to receipt of at least one clear command by the new data storage device.

20. The system of claim 10, wherein each of the plurality of data storage devices is characterized as a solid-state drive (SSD), wherein the device controller circuit of each SSD comprises a programmable processor, and wherein the NVM of each SSD comprises NAND flash memory.

* * * * *